(12) United States Patent
Buta

(10) Patent No.: US 9,669,441 B2
(45) Date of Patent: Jun. 6, 2017

(54) SEGMENTED BREAKER ROLL APPARATUS AND METHOD

(71) Applicant: John R. Buta, Salem, OH (US)

(72) Inventor: John R. Buta, Salem, OH (US)

(73) Assignee: Butech Bliss, Salem, OH (US)

( * ) Notice: Subject to any disclaimer, the term of this patent is extended or adjusted under 35 U.S.C. 154(b) by 117 days.

(21) Appl. No.: 14/601,744

(22) Filed: Jan. 21, 2015

(65) Prior Publication Data
US 2015/0202674 A1    Jul. 23, 2015

Related U.S. Application Data

(60) Provisional application No. 61/929,630, filed on Jan. 21, 2014.

(51) Int. Cl.
*B21C 47/16* (2006.01)
*B21C 47/18* (2006.01)
*B21C 47/34* (2006.01)
*F16C 13/00* (2006.01)
*B21C 47/22* (2006.01)

(52) U.S. Cl.
CPC .............. *B21C 47/18* (2013.01); *B21C 47/16* (2013.01); *B21C 47/22* (2013.01); *B21C 47/3408* (2013.01); *B21C 47/3433* (2013.01); *F16C 13/00* (2013.01)

(58) Field of Classification Search
CPC ......... B21C 47/16; B21C 47/18; B21C 47/22; B21C 47/34; B21C 47/3408; B21C 47/3433; F16C 13/00
USPC ......................................................... 72/183
See application file for complete search history.

(56) References Cited

U.S. PATENT DOCUMENTS

| | | |
|---|---|---|
| 2,508,977 A | 5/1950 | Todd |
| 4,091,649 A | 5/1978 | Johnson |
| 4,158,301 A | 6/1979 | Smith |
| 6,691,544 B2 * | 2/2004 | Steudle .................. B21C 47/18 242/559.4 |
| 2007/0044531 A1 | 3/2007 | Liefer et al. |

* cited by examiner

*Primary Examiner* — David B Jones
(74) *Attorney, Agent, or Firm* — Fay Sharpe LLP; James E. Scarbrough

(57) ABSTRACT

A breaker roll apparatus assembly for minimizing coil breaks in strips has a frame, a center roll extending from a rail mounted to the frame and actuated by a hydraulic cylinder, and a plurality of side rolls positioned on opposite sides of the center roll. The plurality of rolls extend from rails mounted to the frame and are also actuated by hydraulic cylinders. A coil mounting member uncoils a coil of strip through the assembly into contact with the center roll and at least one of the side rolls. Each of the rolls can be raised and lowered to accommodate various diameters and widths of coil.

14 Claims, 5 Drawing Sheets ary or bend to the metal also known as a series of very small bends or "coil breaks". Most manufactured products require that the sheet metal be substantially flat, thus making it necessary to remove coil set during processing of the sheet metal. Coil set can be removed by removing or unwinding the sheet metal from a coil and feeding it through a roller leveler apparatus having multiple offset rolls.

SEGMENTED BREAKER ROLL APPARATUS AND METHOD

CLAIM OF PRIORITY

This application claims priority from provisional patent application No. 61/929,630, filed on Jan. 21, 2014, which is hereby incorporated by reference in its entirety.

BACKGROUND OF THE DISCLOSURE

The disclosure relates to a segmented breaker roll apparatus. More specifically, it relates to a segmented breaker roll apparatus for eliminating or minimizing coil breaks in metal strips.

Coiling of sheet metal has long been recognized to impart an arcuate curvature or bend to the metal also known as a series of very small bends or "coil breaks". Most manufactured products require that the sheet metal be substantially flat, thus making it necessary to remove coil set during processing of the sheet metal. Coil set can be removed by removing or unwinding the sheet metal from a coil and feeding it through a roller leveler apparatus having multiple offset rolls.

However, as steel is uncoiled on a processing line, the strip is bent in the opposite direction of the natural coil radius at least one or more times. Consequently, as the strip is uncoiled, undesirable and unsightly non uniform bend marks (i.e., "coil breaks") can be produced in the strip. As the coil radius decreases during pay off or unrolling, the severity of the break marks increase. By controlling the uncoiling process, the marks can be eliminated or controlled as to the severity and location.

Existing uncoiler machines use a full face mandrel. The full face mandrel style has a mandrel face width that is wide enough to support a maximum width coil. This type of uncoiler does not need a segmented breaker roll because a typical, full face breaker roll could be engaged and follow the coil outer diameter until the coil is completely uncoiled. In this instance there is no interference between the breaker roll and the uncoiler machine and thus no need for segmented breaker rolls.

However, with a double stub, or double cone uncoiler machine, there are two uncoiler heads that come in against the side walls of the coil and protrude partially into the inner diameter of the coil. The wider the coil, the farther apart the two uncoiler heads need to be spaced. With narrow coils the two uncoiler heads come very close to each other. The wide coils need a wide face breaker roll. However, if a wide face breaker roll were used and the uncoilers are close to each other for a narrow coil, the wide face breaker roll could not be lowered between the two uncoiler heads; rather, it would hit the heads as the coil diameter reduced and payed down. A segmented breaker roll configuration keeps this from happening by keeping the "outer" elements of its roll face above the uncoiler heads.

Another problem with existing devices is that the rolls used to reduce coil breaks can only accommodate a specific coil width. If the roll has a width less than that of the coil, the coil break will not be properly eliminated or minimized.

Another problem with existing devices is that as the diameter of the coil decreases, the roll does not adjust to accommodate the decreasing diameter of the coil.

Thus, it is desired to provide a segmented breaker roll apparatus which overcomes the above-mentioned deficiencies and others while providing better overall results. The apparatus applies a controlled force to the strip by means of various rolls which can be extended or retracted with respect to the coil as needed to accommodate various widths and diameters of the coil and to effectively eliminate or control coil breaks.

SUMMARY OF THE DISCLOSURE

The disclosure relates to a segmented breaker roll apparatus. More specifically, it relates to a segmented breaker roll apparatus for eliminating or minimizing coil breaks in metal strips. The breaker roll uses a very tight radius to tightly control the reverse bend in the coil. The apparatus also applies a controlled force by means of various rolls which can be extended and retracted into and out of contact with the coil to effectively eliminate or control coil breaks in the metal strip. By controlling the initial entry end coil bending process, the coil can be unwound producing a higher value end product. The apparatus is designed to allow the rolls to contact the strip until the complete coil is processed regardless of the width of strip and method of payoff or unrolling of the strip.

The segmented breaker roll configuration is used particularly when the uncoiling machine is a "double stub" or "double cone" uncoiler. The other existing style of uncoiler uses a full face mandrel. The full face mandrel style has a mandrel face width that is wide enough to support a maximum width coil. This style uncoiler does not need a segmented breaker roll because a full face breaker roll could be engaged and follow the coil outer diameter all the way down till coil is done; there would be no interference between the breaker roll and the uncoiler.

With the double stub, or double cone configuration; there are two uncoiler heads that come in against the side walls of the coil and protrude partially into the inner diameter of the coil. The wider the coil, the farther apart the two uncoiler heads. With narrow coils the two uncoiler heads come very close to each other. These wide coils need a wide face breaker roll. If a wide face breaker roll were used and the uncoilers are close to each other for a narrow coil; the wide face breaker roll could not be lowered between the two uncoiler heads, rather, it would hit the heads as the coil diameter payed down. The segmented breaker roll of the present disclosure keeps this from happening by keeping the "outer" elements of its roll face above the uncoiler heads.

Specifically, the segmented breaker roll apparatus includes a main center roll traversing on a fixed rail actuated by a hydraulic cylinder. Additional narrow rolls are located adjacent to the center roll on each side of the center roll. The narrow rolls traverse independently of the center roll within a second rail system by means of additional hydraulic cylinders. These narrow rolls interlock on a centerline with the center roll. The center roll controls the position of the narrow rolls with respect to the coil diameter. The center roll and the selected narrow rolls track the outside diameter of the coil. This maintains the optimum position to eliminate or optimize coil breaks throughout the coil. The apparatus is designed to also traverse perpendicular to the line travel to accommodate the movement of the payoff unit.

Thus, to eliminate or control such coil breaks, the present disclosure applies a controlled force on the coil by means of several narrow rolls and a main center roll. Specifically, multiple segmented narrow rolls located adjacent the center roll on each side provide an additional controlled force on the coil. The narrow rolls can traverse independently of the center roll, allowing the number of narrow rolls that contact the coil to vary depending on the width of the coil. As the diameter of the coil decreases during pay off or unwinding of the coil, the center roll controls the position of the narrow rolls. The center roll and desired number of narrow rolls continuously track the outside diameter of the coil during pay off. Thus, this selective control of the number of narrow rolls helps maintain optimum position to eliminate or optimize coil breaks throughout the coil. Furthermore, being able to select the number of contacting narrow rolls reduces the risk of contact between the rolls and the cones which support the coil as it pays off.

In accordance with one aspect of the disclosure, a breaker roll apparatus assembly for minimizing coil breaks in strips includes a frame; a center roll extending from a rail mounted to the frame and actuated by a hydraulic cylinder; a plurality of side rolls positioned on opposite sides of the center roll, the plurality of rolls extend from rails mounted to the frame and actuated by a hydraulic cylinder; and a coil mounting member which uncoils a coil of strip through the assembly into contact with the center roll and at least one of side rolls.

In accordance with another aspect of the disclosure, a method of minimizing coil break in a coil of metal strip includes: providing a breaker roll apparatus assembly for minimizing coil breaks in metal, where the apparatus has a housing for housing a center roll and a plurality of side rolls on opposite sides of the center roll; uncoiling a coil of metal strip into contact with the center roll and at least one of the side rolls; minimizing coil break in the coil by passing the coil through the apparatus while maintaining contact with the center roll and the at least one side roll; raising and lowering the center roll via an actuating cylinder to remain in contact with the coil to reduce and minimize coil break as a diameter of the coil is changed; and raising and lowering the side rolls via another actuating cylinder to be in or out of contact with the coil to reduce and minimize coil break as the coil diameter is changed.

Another aspect of the disclosure is a main center roll which traverses on a fixed rail which is actuated by a hydraulic cylinder.

Another aspect of the disclosure is additional narrow rolls which are located adjacent to the center roll on each side of the center roll and traverse or move independently of the center roll within or via a second rail system by means of hydraulic cylinders.

Another aspect of the disclosure is a plurality of rolls for accommodating various widths of coil which can be lowered between the coil heads as the coil is payed down without contacting coned heads.

Another aspect of the disclosure is rolls which can be raised and lowered to accommodate various diameters of coil.

Another aspect of the disclosure is a coil diameter in the range of a max outer diameter of 82 inches to a minimum inner diameter of 20 inches.

Another aspect of the disclosure is a coil width range from a maximum width of 96 inches to a minimum width of 18 inches.

Another aspect of the disclosure is a strip thickness ranging from 0.054 inches minimum to 0.625 inches maximum.

Still another aspect of the disclosure is a force applied on the segmented roll which is adjustable from 2,000 lbs. for a thickness of 0.054 inches to a width of 24 inches coil, to 38,000 lbs. for a coil of 0.300 inches thick and 96 inches wide.

Still another aspect of the disclosure is the narrow rolls interlock on the same centerline with the center roll. The center roll controls the position of the narrow rolls with respect to the coil diameter. The center roll and the selected narrow rolls track the outside diameter of the coil. By continuing this process, the marks can be eliminated or controlled as to the severity or location of the marks.

Still other aspects of the disclosure will become apparent upon a reading and understanding of the following detailed description.

DETAILED DESCRIPTION OF THE DISCLOSURE

The disclosure relates to a segmented breaker roll apparatus. Specifically, it relates to a segmented breaker roll for eliminating or reducing coil breaks in metal strip.

The segmented roll of the present disclosure is of particular use when the uncoiling machine is a "double stub" or "double cone" uncoiler.

Figure 5:
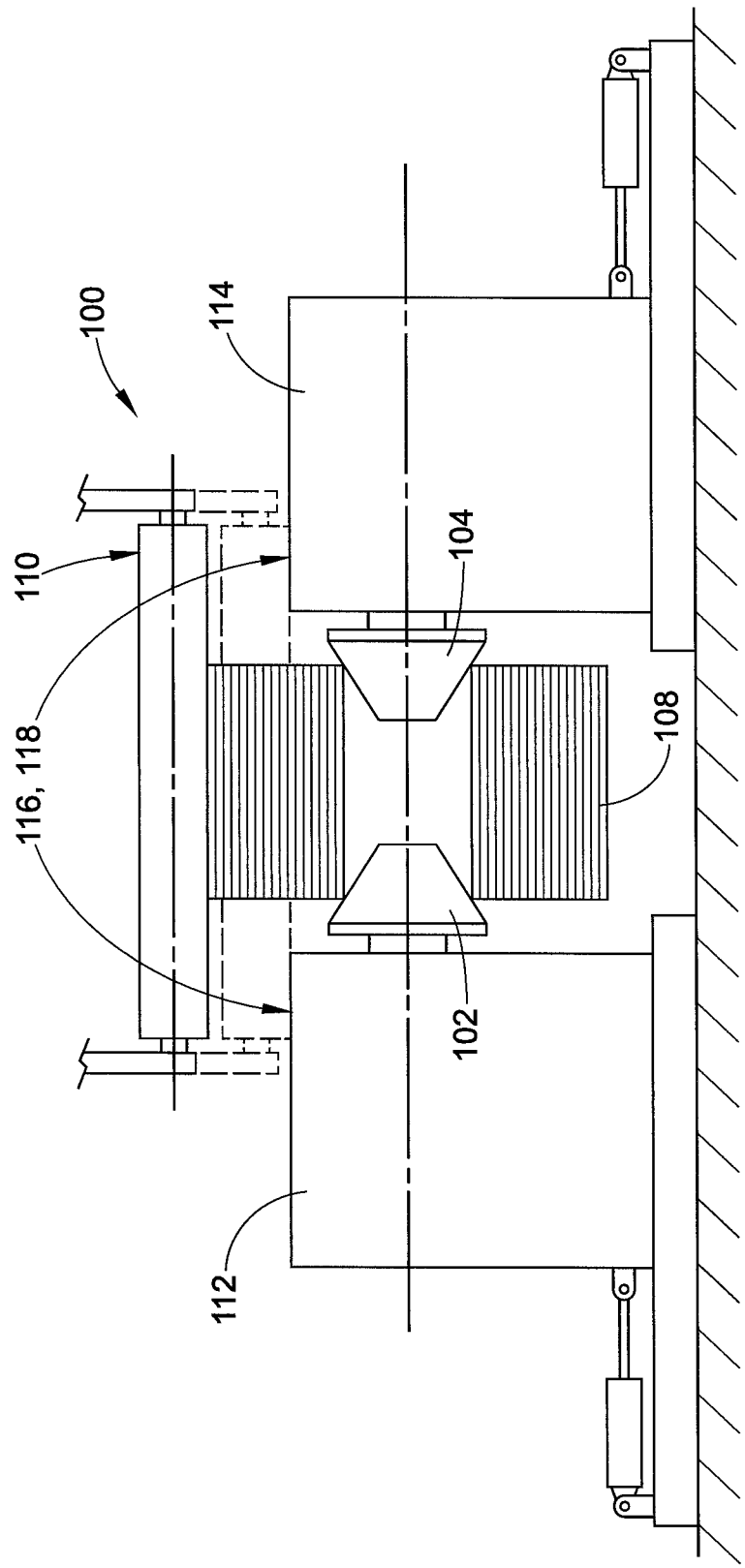
FIG. 5 illustrates an existing full mandrel breaker roll with a narrow coil and coned coil heads.

Referring to FIG. 5, with a double stub, or double cone configuration 100, there are two spaced apart uncoiler heads 102, 104 that come in against the side walls of the coil 108 and protrude partially into the inner diameter of the coil. The wider the coil, the farther apart the two uncoiler heads are positioned. With narrow coils the two uncoiler cones 102, 104 come very close to each other. The wide coils need a wide face breaker roll. If a wide face breaker roll 110 were used and the uncoilers are close to each other for a narrow coil; the wide face breaker roll could not be lowered between the two uncoiler heads, instead, it would hit bodies 112, 114 of the heads at top surface areas 116, 118 as the coil diameter is payed down and reduces and thus the roll 110 is unable to continue downward as the coil diameter is reduced. The segmented roll of the present disclosure prevents this from happening by keeping the "outer" elements of its roll face above the uncoiler heads.

Referring now to FIGS. 1-4, a segmented breaker roll apparatus A in accordance with a preferred embodiment of the disclosure is shown. The present apparatus applies a controlled force by means of various rolls to effectively eliminate or control coil breaks. By controlling the initial entry end coil bending process, the coil can be unwound producing a higher value end product. The present apparatus is designed to allow the rolls to contact the strip until the complete coil is processed regardless of the width and method of payoff.

Figure 2:
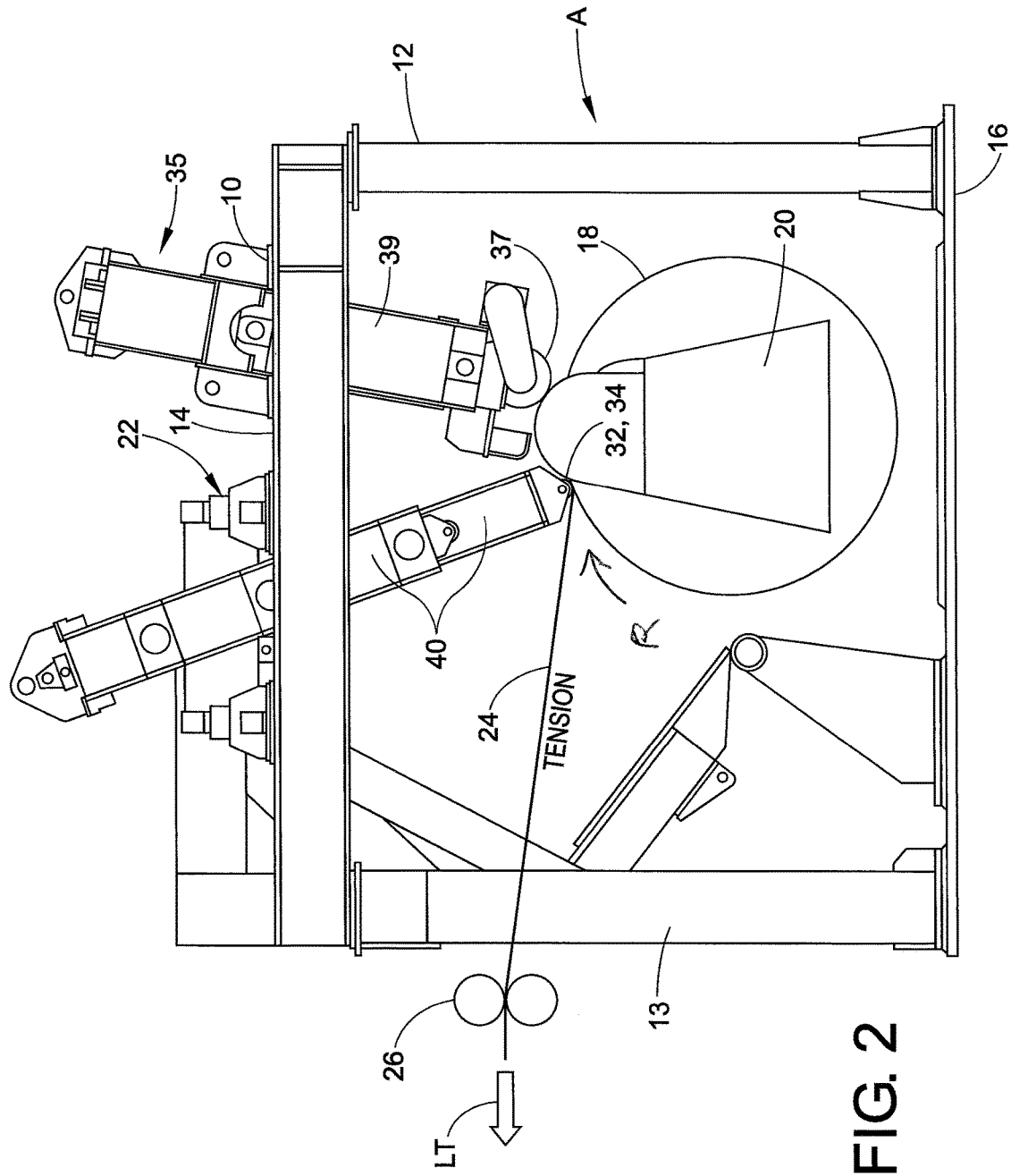
FIG. 2 illustrates a side elevational view of a breaker roll assembly in accordance with one aspect of the disclosure.

Specifically, apparatus A includes an outer support frame 10 including vertical side members or beams or columns 12, 13, a top horizontal beam or member 14, and a bottom or base foundation/floor 16. A spool or coil 18 of sheet metal is centrally positioned within the support frame and is mounted on an uncoiling roller mechanism 20 positioned within the frame 10. An upper traverse rail assembly 22 is mounted on upper beam 14 of the support frame 10 and extends between the two side columns 12. A strip of sheet metal 24 is uncoiled or unrolled from the coil 18 and is fed through a pair of pinch rollers 26 positioned outside of the support frame. The sheet metal strip 24 is fed through in tension from the coil 18 past a series of breaker rolls 32, 34 and then outwardly through the pinch rollers 26. The line of travel LT of the strip 24 is shown in FIG. 2. The breaker rolls 32, 34 maintain a tight bend radius R at and on the outer coil face. The bend radius R is formed by the rolls at the coil face (see FIG. 2).

The segmented breaker rolls can be used with a wide range of products (i.e., coils of steel). For example, lighter gauges (e.g., less than 0.100 inches thick) at higher yield strengths (e.g., greater than 60,000 psi) requires a tighter bend radius than heavier gauges (e.g., 0.313 inch thickness) at lower yield strengths (e.g., 30,000 psi). The range of bend radius applied to the coil strip can vary from around 8 inches at the tightened bend requirement to around 52 inches at the largest bend requirement. The achieved bend radius is proportional to the force the segmented roll applies to the strip. The bend radius is also proportional to the force the segmented roll applies to the strip. It is also proportional to the tension that is pulling the strip up from under the segmented roll. A higher tension on the light gauge strip causes it to assume the tighter bend radius at the segmented roll. In a preferred embodiment of the disclosure, the bend radius is typically 32 inches maximum. If the strip is pulled tightly around the roll, the radius could potentially be as tight as 2.5 inches.

Figure 3:
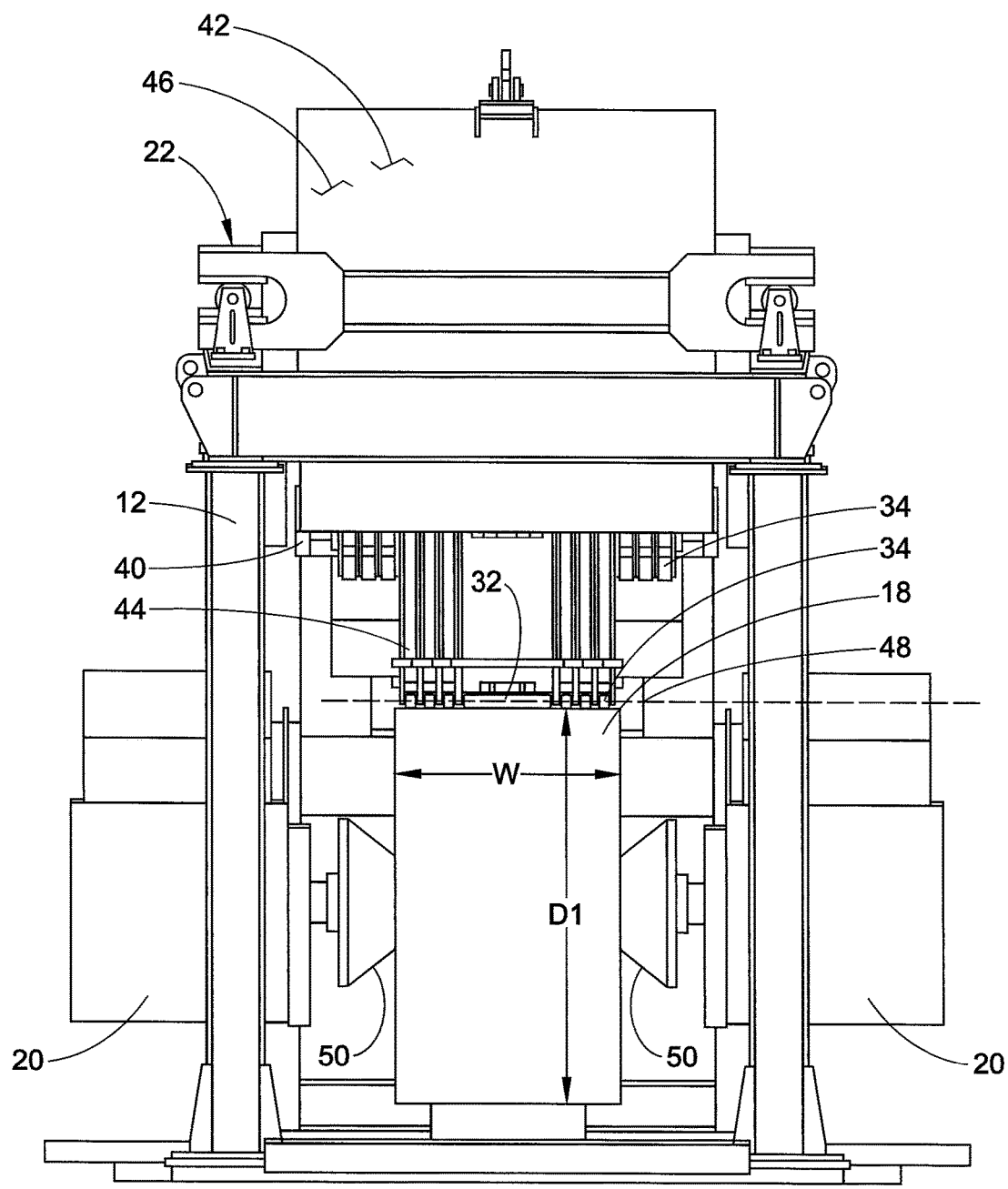
FIG. 3 illustrates an end elevational view of the breaker roll apparatus with the breaker at maximum coil diameter of FIG. 1.
Figure 4:
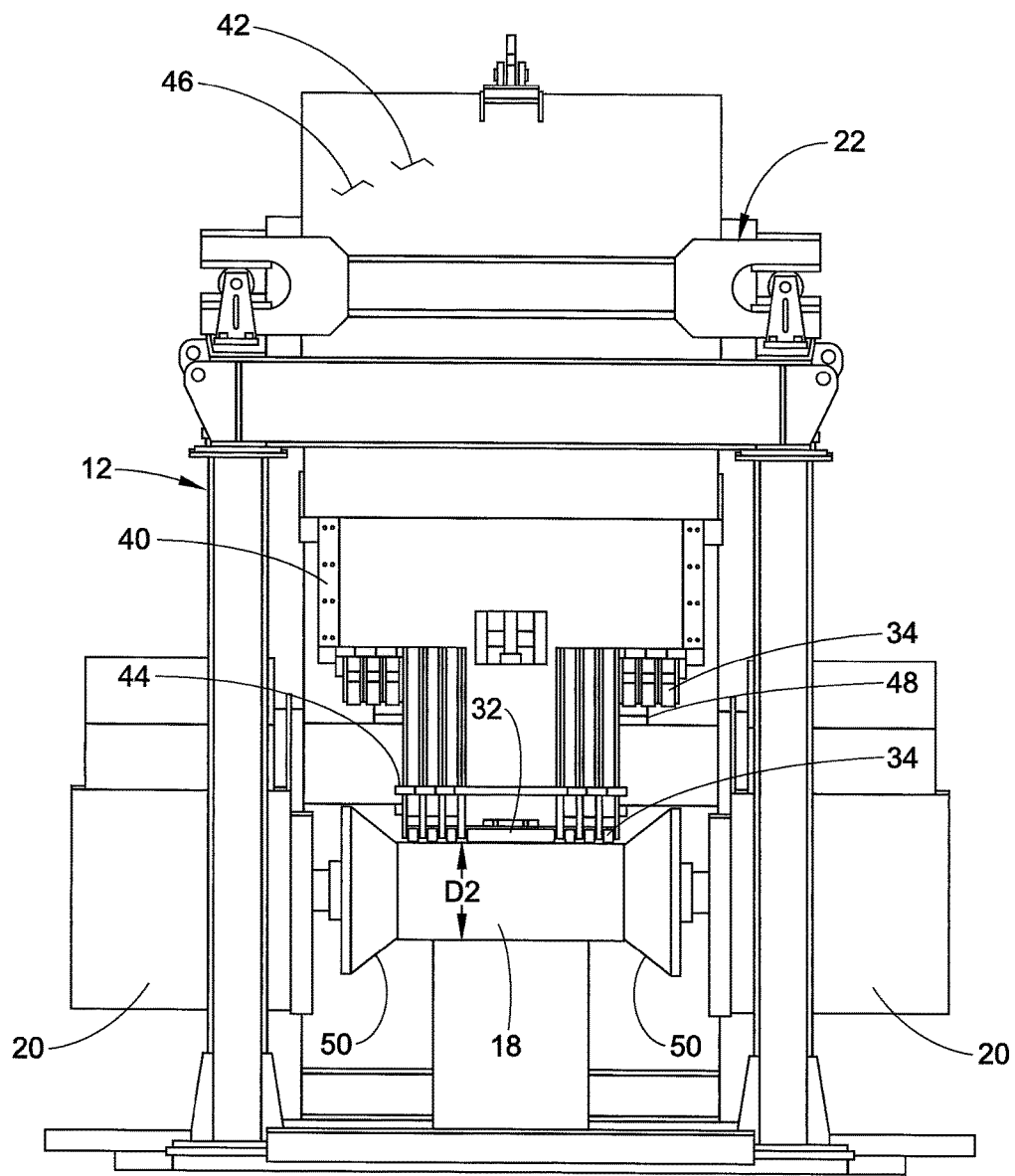
FIG. 4 illustrates an end elevational view of the breaker roll apparatus of FIG. 1 with the breaker at a minimum coil diameter.

The breaker rolls 32, 34 are positioned to accommodate a maximum coil diameter D1 of coil 18 as seen in FIG. 3 and are positioned to accommodate a minimum coil diameter D2 of coil 18 as seen in FIG. 4.

Generally, coil width of coil 18 can vary from around 18 inches (i.e., the narrowest width) to above 72 inches or so wide (i.e., the widest width). These widths may also vary without depending from the scope of the disclosure. Coil 18 can have a diameter ranging from about 20 inches to about 82 inches. Other diameters are contemplated by the disclosure. The metal strip itself can preferably have a thickness in the range of 0.054 inches to about 0.300 inches, but have a thickness of about 0.625 inches or more.

Figure 1:
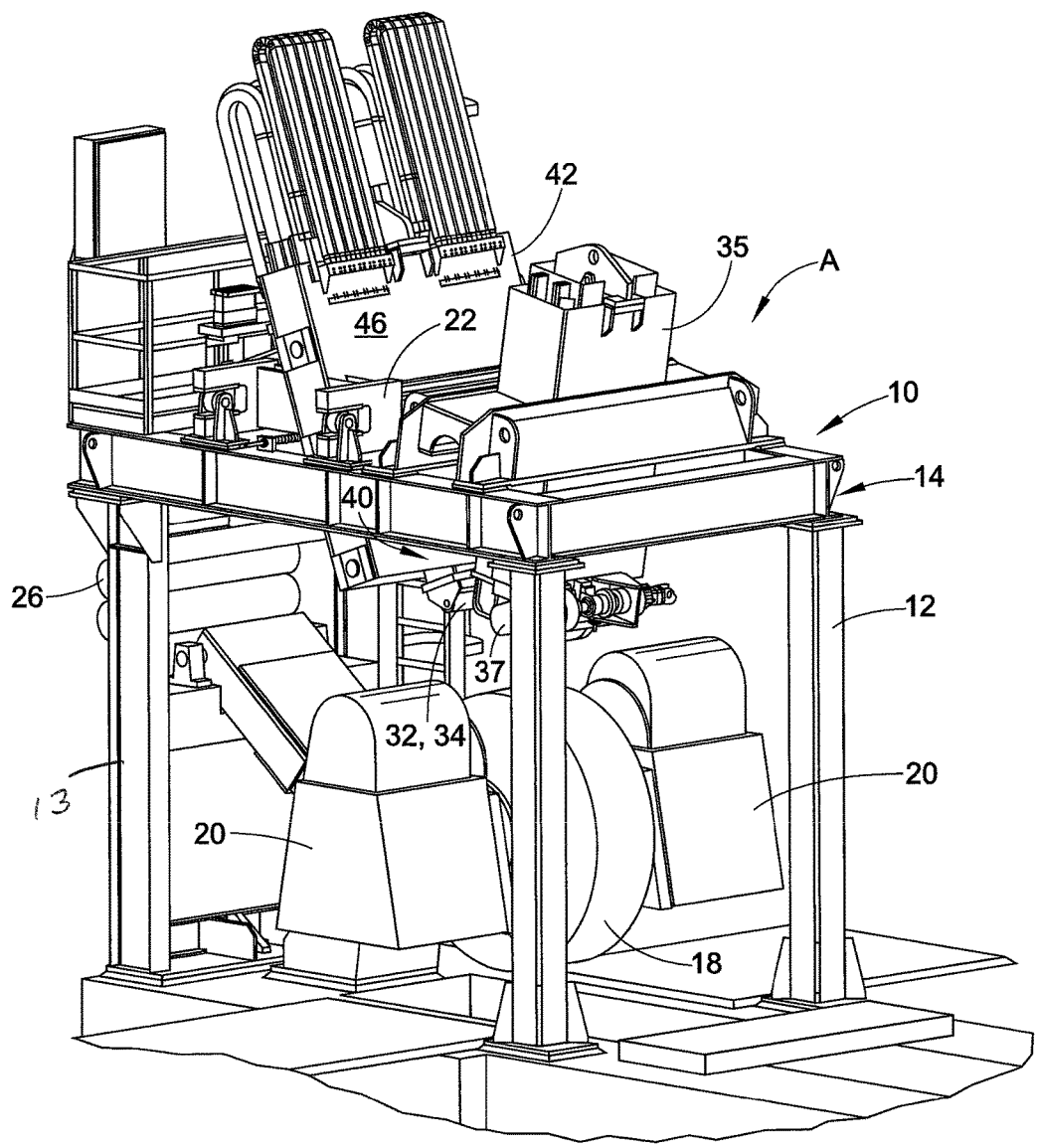
FIG. 1 is a perspective view of a segmented breaker roll uncoil assembly in accordance with a preferred embodiment of the disclosure.

Referring to FIGS. 1 and 2, a snubber assembly 35 is positioned in a radially spaced apart position from rolls 32, 34. Snubber rolls 37 are raised and lowered such as by hydraulic activation arm 39 and are used during the threading of the metal strip at the beginning of the coil. The snubber roll 37 engages the outer diameter of the coil and keeps the coil from clock-springing during the thread up. Typically during a line run the snubber roll is raised out of contact with the strip.

Referring to FIG. 3, the breaker rolls 32, 34 include a center wide roll 32 and a series of parallel narrow rolls 34 on opposite sides of center roll 32. The narrow rolls are each preferably about 4 inches in width to form a 24 inch wide face (including six rolls) on each side of the center roll, which itself can be about 24 inches wide. That is, six rolls form a 24 inch wide face on opposite sides of the center roll. The preferred total width thus equals 72 inches, or the width W corresponding to the widest coil. In this embodiment, the width W of the coil can vary from 24 inches to 72 inches. Other widths however are also contemplated by the disclosure.

The breaker rolls can be used in a variety of process lines; these process lines are designed and rated based on the maximum width coils and maximum thickness strips that can be handled. For example, some of the coils can be 0.250 inch thickness×72 inch width (pickle lines); 0.5 inch thickness×60 inch width (cut to length line) or 0.625 inch thickness×96 inch width (cut to length line). The heavier gauge is not necessarily associated with a wider coil. Rather, the segmented breaker roll is sized to fit the maximum width coil for the particular line.

The preferred embodiment shows twelve narrow rolls 34 (i.e., six of each rolls on opposed side of the center roll 32). However, other numbers of side rolls can be used with the present disclosure. The center roll is the widest of the rolls but it is not as wide as the narrowest coil. In other words, the coil 18 is always wider than the widest roll.

Main center roll 32 traverses on a rail 40 actuated by a hydraulic cylinder 42 (hidden in FIG. 3) connected to traverse rails 22 and is moved upwardly or downwardly to remain in contact with a coil as the coil diameter changes. Additional narrow side rolls 34 are located adjacent to the center roll 32 on opposite sides of the center roll. The narrow rolls 34 traverse independently of the center roll within a second rail system comprising side rails 44 by means of hydraulic cylinders 46 (also hidden in FIG. 3). These narrow rolls 34 interlock on centerline 48 with the center roll 32. The center roll 32 controls the position of the narrow rolls with respect to the coil diameter. The center roll and the selected narrow rolls track the outer diameter of the coil 18 and are moved upwardly or downwardly to remain in contact with the coil. This maintains the optimum position to eliminate or control coil breaks throughout the coil 18. The apparatus is designed to also traverse perpendicular to the line travel to accommodate the movement of the payoff unit 20.

Depending on the width of the coil, the center roll 32 and one or more of the narrow rolls 34 on either side of the center roll are used to track or align with the outside diameter D1, D2 of the coil. That is, narrow rolls 34 are raised or lowered into contact with the coil as needed. The overall length of the rolls in alignment is maintained so that the cones 50 which are used to hold the coil are not contacted or damaged by the rolls. This use of some of the rolls depending on the width of the coil forms a "segmented" roll configuration.

FIGS. 3 and 4 each show six narrow rolls 34 (with three rolls positioned on each side of center roll) in line with center roll in an extended position contact with a maximum coil diameter (FIG. 2) or a minimum coil diameter (FIG. 3). The coil itself has a narrow width (such as 48 inches) which is contacted by the center roll and six outer rolls (three on each side of the center roll). The other six outer narrow rolls 34 (three on each side of center roll 32) are shown in the retracted position. For a coil of a wide width (such as 72 inches), the center roll and twelve side rolls (six on each side of the center roll) contact the coil. In both examples, the rolls do not contact the coned heads 50 of the uncoiler.

To eliminate or control such coil breaks, the apparatus applies a controlled force on the coil 18 by means of narrow rolls 34 and main center roll 32. An example of the controlled force applied by the segmented roll the coil is adequate from about 2,000 lbs. for a coil of 0.054 thickness and 24 inches width to about 38,000 pounds for a coil of 0.300 inch thickness and 96 inch width. The narrow rolls 34 can traverse independently of the center roll 32, allowing the number of narrow rolls that contact the coil 18 to vary depending on the width of the coil. As the diameter of the coil 18 decreases during pay off, the center roll 32 controls the position of the narrow rolls 34. The center roll 32 and desired number of narrow rolls 34 continuously track the outside diameter of the coil during pay off. Thus, this selective control of the number of narrow rolls 34 helps maintain optimum position to eliminate or minimize coil breaks throughout the coil 18. Furthermore, being able to select the number of contacting narrow rolls 34 reduces the risk of contact between the rolls and the cones 50 which support the coil as it pays off. As seen in FIGS. 3 and 4, the center roll and six side rolls are able to travel along with the coil as its diameter is reduced without contacting the cones 50. For a wider coil, potentially all twelve side rolls can be lowered along with the center roll to maintain contact with the coil as the coil diameter is reduced without contacting cones 50.

The exemplary embodiment has been described with reference to a preferred embodiment. Obviously, modifications and alterations will occur to others upon reading and understanding the preceding detailed description. It is intended that the exemplary embodiment be construed as including all such modifications and alterations insofar as they come within the scope of the appended claims and detailed description herein.

The invention claimed is:

1. A breaker roll apparatus assembly for minimizing coil breaks in metal strips comprising:
    a frame;
    a center roll extending from said frame and traversing a center rail;
    a plurality of side rolls positioned on opposite sides of said center roll, said plurality of rolls extend from said frame; wherein each of said side rolls traverse side rails; and
    a coil mounting member having a coil of metal strip thereon; wherein each of said side rolls are raised or lowered within said side rails out of or into contact with said coil of metal strip via hydraulic cylinders so that an entire width of said coil is in contact with said center roll and said side rolls; wherein said member uncoils said coil of strip through the assembly into contact with said center roll and at least one of side rolls thereby minimizing coil break in said coil of strip as said strip passes through said assembly and, wherein said side rolls and said center roll align along a common centerline during contact with said coil.

2. The breaker roll apparatus of claim 1, further comprising a roller mechanism in said coil mounting member which holds and uncoils said coil of strip.

3. The breaker roll apparatus of claim 1, wherein said frame comprises:
    side columns;
    an upper member extending between said side columns;
    a base member extending between said side columns; and
    a pair of traverse rails extending between said side columns.

4. The breaker roll apparatus of claim 3, wherein said center rail assembly is positioned between said pair of traverse rails.

5. The breaker roll apparatus of claim 4, wherein said center rail is actuated by a hydraulic cylinder assembly.

6. The breaker roll apparatus of claim 1, wherein said center roll is approximately 24 inches in width.

7. The breaker roll apparatus of claim 6, wherein said side rolls are each approximately 4 inches in width.

8. The breaker roll apparatus of claim 1, wherein said plurality of side rolls positioned on opposite sides of said center roll comprises six side rolls positioned on each of said opposite sides of said center roll.

9. The breaker roll apparatus of claim 1, wherein each of said rolls are separately raised into contact with said coil.

10. The breaker roll apparatus of claim 1, wherein said center roll is raised and lowered into contact with said coil.

11. The breaker roll apparatus of claim 1, wherein a bend radius is formed by said center roll and said at least one side rolls contacting said coil.

12. The breaker roll apparatus of claim 1, further comprising a pair of pinch rollers at an exit of said apparatus, when said coil passes between said pinch rollers while exiting said assembly.

13. A method of minimizing coil break in a coil of metal strip, comprising:
    providing a breaker roll apparatus assembly for minimizing coil breaks in metal, said apparatus comprising a housing for housing a center roll and a plurality of side rolls on opposite sides of said center roll;
    uncoiling a coil of metal strip positioned with said apparatus into contact with said center roll and at least one of said side rolls;
    minimizing coil break in said coil by passing said coil through said apparatus while maintaining contact with said center roll and said at least one side roll;
    raising and lowering said center roll via an actuating cylinder to remain in contact with said coil to reduce coil break as a diameter of said coil is changed; and
    raising and lowering said side rolls via another actuating cylinder to be in or out of contact with said coil to reduce coil break as said coil diameter is changed; and wherein said center roll and said side rolls align along a common centerline when in contact with said coil.

14. The method of claim 13, further comprising:
    providing a pair of pinch rollers at an exit of said apparatus; and
    feeding said coil through said pinch rollers as said coil exits said apparatus.

\* \* \* \* \*